Jan. 2, 1934.  E. H. FISHER  1,941,674
JAR SEALER
Filed Feb. 11, 1933   2 Sheets-Sheet 1

Inventor
Ernest H. Fisher

By Clarence A. O'Brien
Attorney

Jan. 2, 1934.   E. H. FISHER   1,941,674
JAR SEALER
Filed Feb. 11, 1933   2 Sheets-Sheet 2

Inventor
Ernest H. Fisher
By Clarence A. O'Brien
Attorney

Patented Jan. 2, 1934

1,941,674

UNITED STATES PATENT OFFICE 1,941,674

JAR SEALER

Ernest H. Fisher, Cleveland, Ohio

Application February 11, 1933. Serial No. 656,347

1 Claim. (Cl. 81—15.1)

This invention appertains to new and useful improvements in means for sealing the caps of jars and more particularly for sealing the screw type caps of mason type jars.

The principal object of this invention is to provide a small hand operated device which can be easily manipulated against a jar cap to press the lip thereof snugly against the sealing element employed.

During the course of the following specification other important objects and advantages of the invention will become apparent to the reader.

Figure 1:
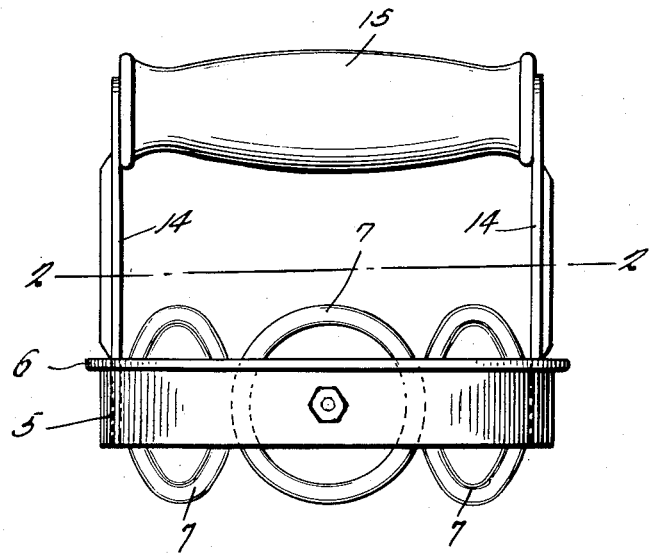
Figure 1 represents a side elevational view of the novel device.

Referring to the drawings wherein like numerals designate like parts, it can be seen in Figure 1 that numeral 5 represents an annular rim having its circumferentially extending reinforcing flange 6 at its upper edge.

Figure 2:
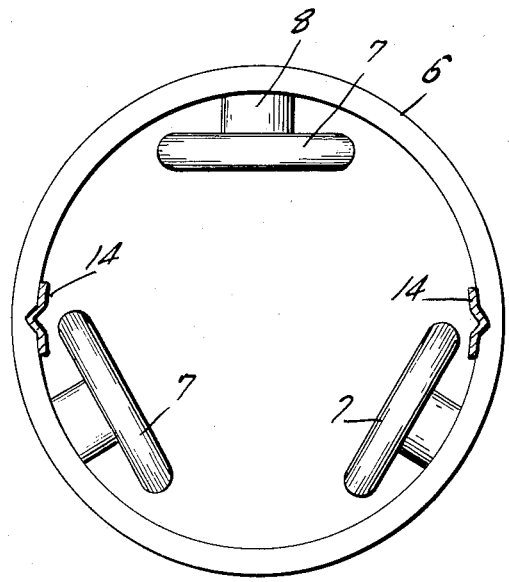
Figure 2 represents a horizontal sectional view taken substantially on line 2—2 of Figure 1.
Figure 3:
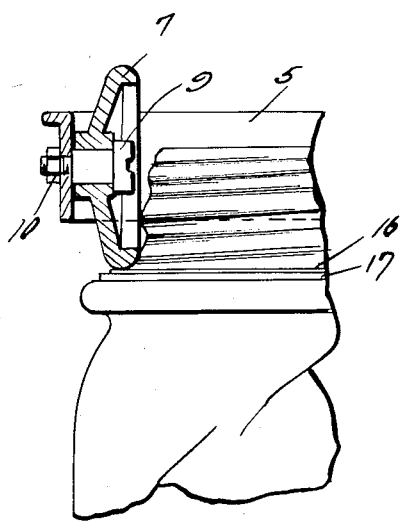
Figure 3 represents a fragmentary vertical sectional view through one form of the invention.

Employed in this sealer are preferably three rollers 7 each of which is provided with a hub 8 protruding beyond one side thereof to bear against the rim 5 in the manner substantially shown in Figure 2. Extending through the hub 8 of each of these rollers is a pin 9 threaded at one end to receive a nut 10 on the outer side of the rim.

The periphery of each roller is curved transversely as is clearly shown.

Figure 4:
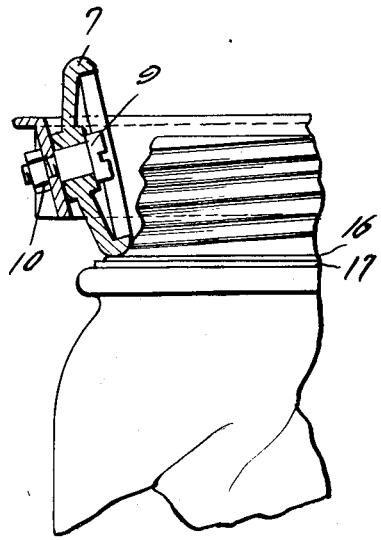
Figure 4 represents a fragmentary vertical sectional view through another form of the invention.
Figure 6:
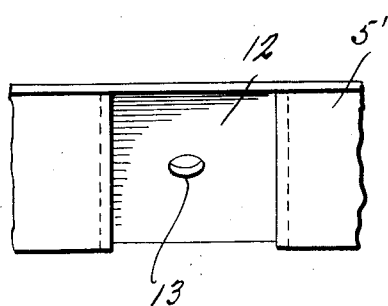
Figure 6 represents a fragmentary outside elevational view of the rim shown in Figure 5.
Figure 5:
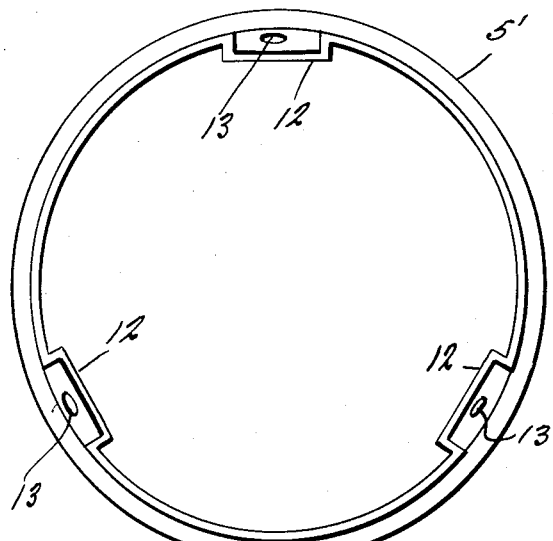
Figure 5 represents a top plan view of the rim employed with the form of the invention shown in Figure 4.

The modified form shown in Figures 4, 5 and 6 consists of a rim 11 provided with inwardly slanting bosses 12 each provided with an opening 13. These bosses are constructed by a stamping process whereby an inclined surface is obtained as shown in Figure 4 against which the hub 8 of each of the rollers can ride, thus causing the roller to set at an angle so as to avoid the upper portion of the jar cap. Furthermore, this particular form of the invention prevents slipping off of the device from the cap.

Each of these rims 5 and 5' has a pair of upright members 14 extending upwardly therefrom at diametrically opposite points and between the upper ends of these uprights is secured the handle 15. The uprights 14 can be reinforced or strengthened in any way desired.

In the use of the device, the cap is first screwed on to the threaded portion of the jar so that the lip 16 will press against the packing washer 17. The sealer is now placed with the rollers engaged against this lip 16 and by forcing downwardly and rotating the device, the lip 16 is pressed snugly against the packing washer 17 so as to increase the sealing ability of these parts.

While the foregoing specification sets forth the invention in specific terms it is to be understood that numerous changes in the shape, size and materials may be resorted to without departing from the spirit and scope of the invention as claimed hereinafter.

Having described the invention, what is claimed as new is:

A sealer of the character described comprising an annulus, a handle for the annulus whereby the annulus can be rotated, said annulus being provided on its inner side with a plurality of angularly set constructions, rollers each provided with a hub and means for mounting the rollers on the inclined constructions with their hubs abutting the same so that the said rollers will each operate on an inclined plane.

ERNEST H. FISHER.